(12) United States Patent
Nishimura

(10) Patent No.: US 11,498,840 B2
(45) Date of Patent: Nov. 15, 2022

(54) CRUSHED POLYCRYSTALLINE SILICON LUMPS AND METHOD FOR PRODUCING SAME

(71) Applicant: Tokuyama Corporation, Yamaguchi (JP)

(72) Inventor: Shigeki Nishimura, Yamaguchi (JP)

(73) Assignee: Tokuyama Corporation, Yamaguchi (JP)

( * ) Notice: Subject to any disclaimer, the term of this patent is extended or adjusted under 35 U.S.C. 154(b) by 24 days.

(21) Appl. No.: 17/042,235

(22) PCT Filed: Mar. 25, 2019

(86) PCT No.: PCT/JP2019/012542
§ 371 (c)(1),
(2) Date: Sep. 28, 2020

(87) PCT Pub. No.: WO2019/189001
PCT Pub. Date: Oct. 3, 2019

(65) Prior Publication Data
US 2021/0114884 A1    Apr. 22, 2021

(30) Foreign Application Priority Data
Mar. 28, 2018  (JP) .............................. JP2018-061666

(51) Int. Cl.
*C01B 33/037*      (2006.01)
*B02C 19/00*       (2006.01)
*B02C 23/20*       (2006.01)

(52) U.S. Cl.
CPC ........ *C01B 33/037* (2013.01); *B02C 19/0012* (2013.01); *B02C 19/0056* (2013.01); *B02C 23/20* (2013.01); *C01P 2006/80* (2013.01)

(58) Field of Classification Search
CPC .............. C01B 33/037; B02C 19/0012; B02C 19/0056; B02C 23/20
See application file for complete search history.

(56) References Cited

U.S. PATENT DOCUMENTS

| | | | | |
|---|---|---|---|---|
| 5,188,986 A * | 2/1993 | Liu | ........................ | H01L 21/321 438/491 |
| 5,466,389 A * | 11/1995 | Ilardi | ..................... | C11D 3/046 510/175 |
| 6,309,467 B1 * | 10/2001 | Wochner | ........... | H01L 21/02052 134/2 |
| 7,549,600 B2 | 6/2009 | Hesse et al. | | |
| 7,694,568 B2 | 4/2010 | Hegen et al. | | |
| 7,950,600 B2 | 5/2011 | Gruebl et al. | | |
| 9,266,741 B2 | 2/2016 | Wochner et al. | | |
| 2007/0037400 A1 * | 2/2007 | Hwang | ............. | H01L 21/32134 438/753 |
| 2011/0186087 A1 | 8/2011 | Wochner et al. | | |
| 2013/0189176 A1 | 7/2013 | Wochner et al. | | |
| 2014/0004030 A1 | 1/2014 | Fabry et al. | | |
| 2014/0037959 A1 * | 2/2014 | Wochner | ................. | C22C 38/00 428/402 |
| 2016/0339485 A1 | 11/2016 | Nishimura et al. | | |

FOREIGN PATENT DOCUMENTS

| | | | | |
|---|---|---|---|---|
| CN | 10139367 A | 12/2008 | | |
| CN | 102251242 A | 11/2011 | | |
| CN | 104409324 A | 3/2015 | | |
| DE | 102008040231 A1 * | 12/2008 | ........... | C01B 33/035 |
| EP | 2620411 A1 | 7/2013 | | |
| JP | H621034 A | 1/1994 | | |
| JP | 2006192423 A | 7/2006 | | |
| JP | 2011095268 A | 5/2011 | | |
| JP | 2013129593 A | 7/2013 | | |
| JP | 2014031309 A | 2/2014 | | |
| JP | 2015199619 A * | 11/2015 | | |
| JP | 2016070873 A | 5/2016 | | |

OTHER PUBLICATIONS

English Abstract for CN104409324 A, Mar. 11, 2015.
WIPO International Preliminary Report on Patentability for Application No. PCT/JP2019/012542, dated Oct. 8, 2020.
English Abstract for JP2013129593 A, Jul. 4, 2013.
English Abstract for JP2016070873 A, May 9, 2016.
English Abstract for JP2014031309, Feb. 20, 2014.
English Abstract for CN10139367A, Dec. 10, 2008.
English Abstract for JP2011095268A, May 12, 2011.
English Abstract for JP2006192423, Jul. 27, 2006.
English Abstract for JPH621034, Jan. 28, 1994.
English Abstract for CN102251242 A, Nov. 23, 2011.
English Abstract for EP2620411A1, Jul. 31, 2013.
Extended European Search Report, dated Oct. 26, 2021.

* cited by examiner

*Primary Examiner* — Colin W. Slifka
*Assistant Examiner* — Michael Forrest
(74) *Attorney, Agent, or Firm* — Cahn & Samuels, LLP

(57) ABSTRACT

A crushed polycrystalline silicon lump is provided in which a surface metal concentration is 15.0 pptw or less and preferably 7.0 to 13.0 pptw, and in the surface metal concentration, a surface tungsten concentration is 0.9 pptw or less and preferably 0.40 to 0.85 pptw, and a surface cobalt concentration is 0.3 pptw or less and preferably 0.04 to 0.08 pptw.

4 Claims, No Drawings

CRUSHED POLYCRYSTALLINE SILICON LUMPS AND METHOD FOR PRODUCING SAME

This application is a U.S. national stage application of PCT/JP2019/012542 filed on 25 Mar. 2019 and claims priority to Japanese patent document JP 2018-061666 filed on 28 Mar. 2018, the entireties of which are incorporated herein by reference.

TECHNICAL FIELD

The present invention relates to a crushed polycrystalline silicon lump, and more particularly to, a crushed polycrystalline silicon lump which is obtained by crushing a polycrystalline silicon rod and has a clean surface. In addition, the invention relates to a method for manufacturing the crushed polycrystalline silicon lump.

BACKGROUND OF THE INVENTION

A high-density integrated electronic circuit requires a high-purity single crystalline silicon wafer. Typically, the single crystalline silicon wafer is obtained by cutting a single crystalline silicon rod manufactured by a Czochralski method (CZ method). As a raw material for manufacturing the CZ-method single crystalline silicon rod, polycrystalline silicon also called polysilicon has been used.

As the method for manufacturing the polycrystalline silicon, Siemens method is known. In the Siemens method, a silicon core wire disposed inside a bell-jar type reaction container is heated to a silicon deposition temperature by energization, a gas of a silane compound such as trichlorosilane ($SiHCl_3$) or monosilane ($SiH_4$) and hydrogen are supplied to the reaction container, polycrystalline silicon is deposited onto the silicon core wire by a chemical vapor deposition method to obtain the high-purity polycrystalline silicon rod.

The obtained polycrystalline silicon rod is crushed and classified into a size appropriate for a device that is used in the subsequent process, or appropriate for manufacturing an objective product in the subsequent process, and is conveyed to the subsequent process. Specifically, the polycrystalline silicon rod is crushed with a hammer or the like made of a hard metal to obtain a roughly crushed polycrystalline silicon lump. Thereafter, the roughly crushed polycrystalline silicon lump is crushed to a desired particle size by a crushing device made of a hard metal, and is classified to a desired size by a classifying device as necessary, and crushed polycrystalline silicon lumps classified for each particle size are obtained. The crushed polycrystalline silicon lumps are used as a raw material for the CZ method single crystalline silicon rod.

In respective crushing steps until obtaining the crushed polycrystalline silicon lumps from the polycrystalline silicon rod, the hard metal used in a striking part of a breaking tool such as a hammer or a jaw crusher is usually a tungsten carbide/cobalt alloy (WC/Co alloy). That is, the WC/Co alloy is cemented carbide composed of a sintered body of tungsten carbide (WC) and cobalt (Co) which is a binder (for example, refer to Patent Document 1 [0016], Patent Document 2 [0009], and Patent Document 3 [0022]).

Accordingly, it is unavoidable that the surface of the crushed polycrystalline silicon lumps is contaminated by metal impurities mainly including the WC/Co alloy. Even in a small amount, the metal impurities cause a defect site to occur in the single crystalline silicon wafer that is used in the high-density integrated electronic circuit or the like, and the impurity finally deteriorates a device performance and limits a circuit density.

Therefore, in the crushed polycrystalline silicon lumps, it is necessary to reduce the concentration of the metal impurities on the surface as much as possible, and thus washing or the like is performed to remove the metal impurities, thereby increasing surface cleanliness. As a method of washing a surface of a semiconductor substrate made of silicon, an etching treatment with a fluonitric acid aqueous solution is performed (for example, refer to Patent Document 4). The etching treatment with the fluonitric acid aqueous solution is also applied to washing of the crushed polycrystalline silicon lumps, favorably dissolves an oxide film formed on the surface of the crushed polycrystalline silicon lumps, and also dissolves various metals or oxides thereof attached to the oxide film. In addition, the fluonitric acid aqueous solution is excellent in solubility of not only the oxide film but also silicon, and thus the metal impurities embedded in the silicon surface can be considerably removed.

However, in a semiconductor field where the circuit density is further increasing, the demand for wafer defect prevention is increasing, and it is necessary to further reduce the concentration of the metal impurities on the surface of the crushed polycrystalline silicon lumps. Particularly, in a case where the metal impurities are carbides, since solubility in the fluonitric acid aqueous solution is extremely low, removability of tungsten carbide (WC) contained in a material of the breaking tool is not satisfactory, and the concentration of tungsten cannot be reduced to 2 pptw or less (for example, refer to Comparative Example in Patent Document 5). For this reason, various proposals have been made to improve the removability of metal impurities not only with the washing with the fluonitric acid aqueous solution but also in combination with washing step with another washing solution.

For example, there is known a method of performing washing with a specific oxidizing solution (pre-washing: aqueous solution of fluonitric acid and hexafluorosilicic acid, post-washing: ozone aqueous solution) before and after washing with a fluonitric acid aqueous solution (refer to the above-described Patent Document 5 [0024]). In addition, there is known a method in which pre-washing with an acidic liquid or an alkaline liquid is performed prior to the etching treatment with the fluonitric acid aqueous solution, and a hydrophilic treatment with ozone water is performed after the etching treatment with the fluonitric acid aqueous solution (refer to Patent Document 6 [0065] and [0080]). Here, as the alkaline liquid applied in the treatment performed before the etching treatment with the fluonitric acid aqueous solution, a sodium hydroxide aqueous solution and a potassium hydroxide aqueous solution are shown.

CITATION LIST

Patent Document

Patent Document 1: JP 2006-192423 A
Patent Document 2: JP 2009-531172 W
Patent Document 3: WO 15/122455 A
Patent Document 4: JP 06-21034 A
Patent Document 5: JP 2010-536698 W
Patent Document 6: JP 2014-31309 A In a case where a washing step with the fluonitric acid aqueous solution and a washing step with another washing solution are combined, solubility of a silicon surface of the crushed polycrystalline silicon lumps is further enhanced, and for example, in Examples 1 to 3 of the above-described Patent Document 6, the surface of the crushed lumps is etched away to a depth of 30 µm or more, and thus it is possible to realize cleaning in a level equal to or less than the detection limit by several pptw with respect to various metal impurities including tungsten, which exists in the form of the above-mentioned carbide and is difficult to dissolve and remove.

However, the total surface metal concentration of main metal elements (Na, Mg, Al, K, Ca, Cr, Fe, Ni, Co, Cu, Zn, W, Ti, and Mo) to which attention is paid as impurities is still greater than 15 pptw, and a measurement result in which tungsten and cobalt, which are inevitable contaminant metals as the material of the breaking tool, are not less than 1 pptw in an average value of eight measurements ([Table 2], [Table 4], and [Table 6]). In addition, in the washing method of Patent Document 6, an etching amount is 30 µm, and the amount of an etching solution consumed is large, and this becomes the cause for an increase in cost. Note that, the etching amount represents the thickness of the surface of the crushed polycrystalline silicon lumps removed in the washing step.

From the above-described viewpoints, in the crushed polycrystalline silicon lumps, it is desired to obtain crushed polycrystalline silicon lumps from which surface metal contamination is further reduced, particularly, tungsten or cobalt, which is inevitable contamination derived from a material of the breaking tool is highly removed. In addition, an object of the invention is to provide a technology capable of reducing surface metal impurities even in a small etching amount.

SUMMARY OF THE INVENTION

In consideration of the above-described problem, the present inventors have made a thorough investigation. As a result, they found that in washing of crushed polycrystalline silicon lumps, when washing with an alkaline aqueous solution containing hydrogen peroxide is combined in a specific mode in addition to washing with fluonitric acid aqueous solution, a concentration of metal impurities can be greatly reduced even when the etching amount is small and tungsten and cobalt can be highly removed, and they have accomplished the invention.

According to an aspect of the invention, there is provided a crushed polycrystalline silicon lump in which a surface metal concentration is 15.0 pptw or less, and in the surface metal concentration, a surface tungsten concentration is 0.9 pptw or less, and a surface cobalt concentration is 0.3 pptw or less.

In addition, according to another aspect of the invention, there is provided a crushed polycrystalline silicon lump package in which the crushed polycrystalline silicon lump is accommodated in a resin bag.

In addition, according to still another aspect of the invention, there is provided a method for manufacturing the crushed polycrystalline silicon lump, including:

a) a step of crushing a polycrystalline silicon rod;

b) a first washing step of contacting the crushed lump of the polycrystalline silicon rod with a fluonitric acid aqueous solution;

c) a second washing step of contacting the crushed polycrystalline silicon lump that has undergone to the first washing step with an alkali aqueous solution containing hydrogen peroxide; and d) a third washing step of contacting the crushed polycrystalline silicon lump that has undergone the second washing step with the fluonitric acid aqueous solution.

Effect of the Invention

In the crushed polycrystalline silicon lump of the invention, a surface is highly cleaned, the concentration of metal impurities is 15.0 pptw or less, and with regard to tungsten and cobalt which are inevitable contamination metals derived from a material of a breaking tool for obtaining the crushed polycrystalline silicon lump, the former is 0.9 pptw or less and the latter is 0.3 pptw or less. Accordingly, in a semiconductor field where circuit density is increasing, the crushed polycrystalline silicon lump having a clean surface is very useful as a raw material for manufacturing a CZ-method single crystalline silicon rod from which a less defective single crystalline silicon wafer is cut out.

DETAILED DESCRIPTION OF THE INVENTION

Hereinafter, the invention will be described in more detail.

A crushed polycrystalline silicon lump according to the invention is obtained by crushing a polycrystalline silicon rod. With regard to the polycrystalline silicon rod, a manufacturing method is not limited. However, typically, a polycrystalline silicon rod manufactured by a Siemens method is set as a target. Here, in the Siemens method, a silane raw material gas such as trichlorosilane or monosilane is brought into contact with a heated silicon core wire to thereby growing (depositing) polycrystalline silicon on a surface of the silicon core wire by a chemical vapor deposition (CVD) method. A polycrystalline silicon rod obtained is crushed to obtain crushed polycrystalline silicon lumps. With regard to the size of the crushed polycrystalline silicon lump, at least 90% by mass of the lumps preferably have the size of a major axis in a range of 2 to 160 mm. In this range, classification is typically performed in correspondence with a particle size. Specifically, classification is performed into a crushed polycrystalline silicon lump in which the size of the major axis is in a range of 90 to 160 mm in at least 90% by mass, a crushed polycrystalline silicon lump in which the size of the major axis is in a range of 10 to 120 mm in at least 90% by mass, a crushed polycrystalline silicon lump in which the size of the major axis is in a range of 10 to 60 mm in at least 90% by mass, a crushed polycrystalline silicon lump in which the size of the major axis is in a range of 2 to 10 mm in at least 90% by mass, and the like.

Impurities derived from a raw material or a peripheral device are contaminated in the polycrystalline silicon rod at the time of manufacturing the polycrystalline silicon rod. This is called bulk contamination. In addition to the bulk contamination, after manufacturing the polycrystalline silicon rod, the crushed polycrystalline silicon lumps are suffered from various kinds of metal contamination in a post-treatment process from crushing of the crushed lumps of the polycrystalline silicon rod to package of the crushed lumps, for example, respective processes such as crushing, classification, washing, transportation, and packaging due to contact with a device or a handling member. The contamination is attached to the surface of the crushed polycrystalline silicon lumps and is called surface metal contamination. The main metals which contaminate the surface of the crushed polycrystalline silicon lumps are fourteen elements including Na, Mg, Al, K, Ca, Cr, Fe, Ni, Co, Cu, Zn, W, Ti, and Mo.

Note that, in the invention, the surface metal concentration of the crushed polycrystalline silicon lumps represents a value in which the mass of each metal contained in the crushed polycrystalline silicon lumps is expressed by a contained amount (pptw) per mass of the crushed polycrystalline silicon lumps, and is a value measured by the following method. That is, in metal concentration analysis of the surface of the crushed polycrystalline silicon lumps as a measurement target, each metal element in a sample solution obtained by dissolving the surface of the crushed polycrystalline silicon lumps is analyzed and weighed with Inductively coupled plasma mass spectrometry (ICP-MS). Specifically, approximately 40 g of crushed polycrystalline silicon lumps is put into a 500 ml clean polytetrafluoroethylene beaker, 100 ml of dissolving solution (50% by mass-HF: 10 ml, 70% by mass-nitric acid: 90 ml) is added into the beaker, and extraction is performed at 25° C. for 15 minutes. A liquid in the beaker and a washing solution used to cleaning the surface of the crushed polycrystalline silicon lumps with 100 ml of ultrapure water are transferred to a clean polytetrafluoroethylene beaker and the resultant solution is set as a surface extraction solution of the crushed polycrystalline silicon lumps. Thereafter, the surface extraction solution is evaporated and dried, 3.5% by mass-nitric acid aqueous solution is added to the residue to a constant volume of 20.0 ml, and this solution was set as a sample solution. The ICP-MS measurement is performed to measure surface metal mass of each of Na, Mg, Al, K, Ca, Cr, Fe, Ni, Co, Cu, Zn, W, Ti, and Mo. A surface metal concentration of the crushed polycrystalline silicon lumps is obtained as a contained amount (pptw) per unit mass of the crushed polycrystalline silicon lumps by dividing a measurement value of the surface metal mass by the mass of the crushed polycrystalline silicon lumps before extraction.

In the crushed polycrystalline silicon lumps according to the invention, the surface metal concentration is 15.0 pptw or less. The surface metal concentration is preferably 7.0 to 13.0 pptw. Since the surface metal concentration is as small as described, the crushed polycrystalline silicon lumps are useful as a raw material for manufacturing the CZ-method single crystalline silicon rod from which a less defective single crystalline silicon wafer is cut out. In the surface metal concentration, a surface tungsten concentration and a surface cobalt concentration are described later, but respective surface concentrations of other metals are suppressed to 5 pptw or less, and more preferably 3 pptw or less.

In addition, in the crushed polycrystalline silicon lumps according to the invention, in the surface metal concentration, the surface tungsten concentration is 0.9 pptw or less, and the surface cobalt concentration is 0.3 pptw or less. The surface tungsten concentration is preferably 0.30 to 0.90 pptw, and more preferably 0.40 to 0.85 pptw. The surface cobalt concentration is preferably 0.03 to 0.10 pptw, and more preferably 0.04 to 0.08 pptw. As described above, a material of the striking part of the breaking tool that is used to crush the polycrystalline silicon rod for obtaining the crushed polycrystalline silicon lumps is typically a WC/Co alloy. However, solubility of a tungsten carbide in a fluonitric acid aqueous solution that is typically used in washing of the crushed polycrystalline silicon lumps is extremely low, and is less likely to be removed. Accordingly, a major characteristic of the invention is in that the low surface metal concentration is accomplished, and low level of the surface tungsten concentration and the surface cobalt concentration are also accomplished.

In the crushed polycrystalline silicon lumps of which a surface is clean, a manufacturing method is not limited, but a preferred manufacturing method is as follows. Specifically, the manufacturing method includes, a) a step of crushing a polycrystalline silicon rod, b) a first washing step of contacting the crushed lump of the polycrystalline silicon rod with a fluonitric acid aqueous solution, c) a second washing step of contacting the crushed polycrystalline silicon lump that has undergone to the first washing step with an alkali aqueous solution containing hydrogen peroxide, and d) a third washing step of contacting the crushed polycrystalline silicon lump that has undergone the second washing step with the fluonitric acid aqueous solution.

According to the method, in the a) step of crushing the polycrystalline silicon rod, surface contamination due to tungsten carbide (WC) or cobalt (Co), which is caused by a WC/Co alloy material of the striking part of the breaking tool, can be highly cleaned up to the above-described range in the subsequent washing steps of b) to d).

It is assumed that the effect is obtained by the following mechanism. Specifically, the surface of the crushed polycrystalline silicon lumps is locally contaminated by WC/Co alloy particles due to striking by the breaking tool in the a) step. Here, the WC/Co alloy particles has an aggregate structure in which tungsten carbide particles are dispersed in a cobalt matrix, and the tungsten carbide particles are highly rigid particles. Accordingly, the tungsten carbide particles are attached to an oxide film formed on the surface of the crushed polycrystalline silicon lumps, and are also embedded inside a surface layer portion. In addition, in the silicon surface layer portion, the tungsten carbide particles which penetrate to a depth greater than 30 μm from the surface also exist.

As described above, most of metal impurities contaminated the surface of the crushed polycrystalline silicon lumps are dissolved and removed in the washing with the fluonitric acid aqueous solution in the subsequent b) first washing step. That is, the oxide film is dissolved in the fluonitric acid aqueous solution and the WC/Co alloy particles which are attached to the oxide film are separated and removed from the surface of the crushed lumps. In addition, the other attached metals also dissolved and removed. In addition, a metal shallowly embedded in the silicon surface layer portion due to striking of crushed lumps is favorably dissolved and removed, since the fluonitric acid aqueous solution has excellent solubility with respect to polycrystalline silicon. In addition, with regard to the WC/Co alloy particles, the cobalt matrix is favorably dissolved and removed. In addition, solubility of the tungsten carbide particles in the fluonitric acid aqueous solution is low, but when the tungsten carbide particles are shallowly embedded, the tungsten carbide particles are completely exposed due to dissolution of the cobalt matrix, and are separated and removed from the surface of the crushed lumps.

However, even in the WC/Co alloy particles, when a lower end thereof penetrates deeply into the silicon surface layer portion, removal thereof is difficult. That is, even though an upper portion of the particle can be exposed due to dissolution of silicon in the etching treatment with the fluonitric acid aqueous solution in the b) step, particles in which a dissolving portion cannot completely reach the lower end thereof remain. Specifically, even when performing etching to a depth of 30 μm, particles which are not exposed completely to the lower end exist.

In addition, even though the exposed upper cobalt matrix portion can be dissolved and removed as described above, when a lower end of the remaining WC/Co alloy particles is embedded in silicon, it is difficult to separate and remove the tungsten carbide particle portion from the surface of the crushed lumps. In addition, in the lower end of the WC/Co alloy particles embedded in silicon, not only the tungsten carbide but also the cobalt matrix remain. In this case, other metal impurities embedded together with penetration of the lower end of the WC/Co alloy particles also remain. That is, this can be assumed as the cause for a result that a concentration of tungsten and a total concentration of metal impurities are not reduced to a satisfactory level regardless of etching and removal of the surface of the crushed polycrystalline silicon lumps up to a depth of 30 μm in Examples 1 to 3 of the above-described Patent Document 6.

In contrast, in the present washing method, in the c) second washing step subsequent to the washing with the fluonitric acid aqueous solution in the b) first washing step, washing with an alkaline aqueous solution containing hydrogen peroxide is performed. In this case, first, tungsten carbide particles which come into contact with the washing solution in the c) second washing step are oxidized by the hydrogen peroxide contained in the washing solution. In this manner, when tungsten carbide is converted into tungsten oxide, the tungsten oxide has high solubility in the alkaline aqueous solution. According to this washing step, an upper portion of tungsten carbide particles which are not removed in the b) first washing step and are exposed to the surface of the crushed polycrystalline silicon lumps is converted into tungsten oxide, and can be dissolved in the alkaline aqueous solution and can be removed in a satisfactory manner. In addition, when the exposed upper portion of the tungsten carbide particles can be dissolved and removed as described above, the dissolving and removing function of the alkaline aqueous solution can be exerted on tungsten carbide in a lower end of the WC/Co alloy particles which penetrate into silicon from a dissolving surface. As a result, in the lower end of the WC/Co alloy particles, a tungsten carbide portion is dissolved and removed, and thus an aggregate structure of the WC/Co alloy is broken. That is, oxidization of tungsten carbide with hydrogen peroxide and dissolution of tungsten oxide with alkali occur in the second washing step, and as a result, tungsten carbide is removed.

In addition, in the washing method of the invention, in the d) third washing step, washing with the fluonitric acid aqueous solution is performed again. In the c) second step, even in a lower end of the WC/Co alloy particles which deeply penetrate into silicon, a tungsten carbide portion is dissolved and removed, and an aggregate structure is broken. Accordingly, in the d) third washing step, the fluonitric acid aqueous solution can deeply penetrate to the inside of crushed lumps, hence, a remaining cobalt matrix and other metal impurities which are contaminants can be highly dissolved and removed. In this manner, when performing the respective washing steps of b) to d) in combination, obtained crushed polycrystalline silicon lumps become highly clean up to the above-described range.

In the washing method of the present embodiment, the CZ-method polycrystalline silicon rod may be crushed into the above-described crushed lump size in accordance with a typical method by using a breaking tool in the a) step of crushing the polycrystalline silicon rod. Examples of the breaking tool include a manual hammer and a mechanical impact tool such as a jaw crusher, a roll crusher, and a hammer mill.

Typically, a material of the breaking tool is a WC/Co alloy as described above. In the WC/Co alloy, the amount of tungsten carbide is preferably 78% by mass to 90% by mass and more preferably 80% by mass to 88% by mass, and the amount of cobalt is preferably 10% by mass to 22% by mass and more preferably 12% by mass to 20% by mass.

In addition, in the b) first washing step, the fluonitric acid aqueous solution as a washing solution contains hydrogen fluoride, nitric acid, and water. With regard to a mixing ratio of respective components, an optimal ratio may be appropriately determined in accordance with a state of crushed polycrystalline silicon lumps, a pre-treatment condition, or the like, but the following mixing ratio is preferable. Specifically, it is preferable that 1 to 20 parts by mass of hydrogen fluoride and 150 to 250 parts by mass of nitric acid are contained with respect to 100 parts by mass of water. Hydrogen fluoride is more preferably 1.5 to 16 parts by mass, and still more preferably 14 to 16 parts by mass.

As water used in the fluonitric acid aqueous solution, it is preferable to use water in which the amount of metal is small, and typically, ultrapure water is used.

In addition, a surfactant may be mixed in the fluonitric acid aqueous solution to improve wettability on the crushed polycrystalline silicon lumps or the like as necessary. As the surfactant, an anionic surfactant such as a carboxylate, a sulfonate, and sulfate and phosphate are preferable, and the amount thereof is 0.01 to 1 parts by mass with respect to 100 parts by mass of water. With regard to the surfactant, it is preferable that the amount metal ions is small.

In a washing method, the crushed polycrystalline silicon lumps are brought into contact with the washing solution in the b) first washing step. As a specific method, the washing solution may be sprayed to the crushed polycrystalline silicon lumps, and typically, a method of immersing the crushed polycrystalline silicon lumps in the washing solution is employed. As an immersing bath, a bath having box-shaped structure may be appropriately used.

Washing with the fluonitric acid aqueous solution may be performed in a plurality of steps. A concentration of the fluonitric acid aqueous solution in respective steps may be the same as each other or different from each other.

A temperature of the washing solution is not particularly limited, but the temperature is preferably 0° C. to 70° C., more preferably 5° C. to 40° C., and still more preferably 10° C. to 30° C.

An etching amount by washing and washing time may be appropriately determined in correspondence with a size of a crushed lump, a shape thereof, the amount of metal impurities, a temperature in washing, a concentration of fluonitric acid in the washing solution, or the like. As the etching amount, it is preferable that the crushed lump is etched by 1.5 to 10 μm from a surface, and more preferably 3 to 7.5 μm. Specific washing time is preferably 0.8 to 25 minutes, and more preferably 3.5 to 20 minutes.

Note that, in the invention, the etching amount of the crushed polycrystalline silicon lumps represents a value obtained as follows. A polycrystalline silicon small-piece group of which a mass and a surface area are measured is etched together with the crushed polycrystalline silicon lumps, and the value is obtained by a mass difference of the polycrystalline silicon small-piece group before and after etching.

The crushed polycrystalline silicon lumps which have undergone the washing in the above-described b) first washing step may be transferred directly to the c) second washing step that is the subsequent process. However, it is preferable to apply the crushed polycrystalline silicon lumps to the c) second washing step after washing with water so as to prevent deterioration of the washing solution in the second washing step due to the attached fluonitric acid aqueous solution. As water used in the washing, it is preferable to use ultrapure water. The crushed polycrystalline silicon lumps washed with water may be dried by blast drying (ventilation drying) to be applied to the subsequent process.

In the subsequent c) second washing step, the washing solution contains hydrogen peroxide, an alkaline compound, and water. With regard to a mixing ratio of respective components, an optimal ratio may be appropriately determined in accordance with a surface state of the crushed polycrystalline silicon lumps which have undergone the b) first washing step, but the following mixing ratio is preferable. Specifically, it is preferable that 1 to 10 parts by mass of alkaline compound is dissolved with respect to 100 parts by mass of water, and more preferably 2 to 5 parts by mass.

Here, as the alkaline compound, an amine-based alkaline compound is typically used, and examples thereof includes ammonia, aliphatic ammonium compounds such as tetramethyl ammonium hydroxide, tetraethyl ammonium hydroxide, tetrapropyl ammonium hydroxide, and tetrabutyl ammonium hydroxide, aromatic ammonium compounds such as phenyl amine (aniline), diphenylamine, and triphenyl amine, and the like.

Among these alkaline compounds, the aliphatic ammonium compounds, particularly, the tetramethyl ammonium hydroxide is preferable because the compounds have a particularly excellent effect of dissolving and removing tungsten oxide.

As water used in the alkaline aqueous solution, it is preferable to use water in which the amount of metal contained is small, and typically, ultrapure water is used. It is preferable that the amount of hydrogen peroxide dissolved in the alkaline aqueous solution is 1 to 10 parts by mass with respect to 100 parts by mass of water, and more preferably 2 to 5 parts by mass. In addition, pH of the washing solution in the c) second washing step is preferably 8 or greater, and more preferably in a range of 9 to 14. When the concentration of the alkaline compound and the pH of the washing solution are set to the above-described ranges, oxidization of tungsten carbide due to hydrogen peroxide and dissolution of tungsten oxide by alkali occur with appropriate balance, and tungsten carbide can be removed with high efficiency.

In addition, in the c) second washing step, a temperature of the washing solution is not particularly limited, but the temperature is preferably 20° C. to 100° C., more preferably 40° C. to 90° C., and still more preferably 50° C. to 80° C. Note that, the washing method is similar as in the case of the b) first washing step. In addition, washing time in the c) second washing step is preferably 1 to 20 minutes in consideration of an effect of removing tungsten, and more preferably 3 to 6 minutes.

It is preferable that the crushed polycrystalline silicon lumps which have undergone the washing in the c) second washing step is applied to the d) third washing step as the subsequent step after performing washing with water, and drying.

Details of washing with the fluonitric acid aqueous solution in the d) third washing step after the c) second washing step may be similar as in the b) first washing step.

With regard to an etching amount in the d) third washing step, it is preferable to be etched by 1.5 to 10 μm, and more preferably 3 to 7.5 μm. In addition, it is preferable that the sum of the etching amount in the b) first washing step and the etching amount in the d) third washing step is set to a range that does not exceed 20 μm, and preferably does not exceed 15 μm. Specific washing time is preferably 0.8 to 25 minutes, and more preferably 3.5 to 20 minutes.

It is also preferable that the crushed polycrystalline silicon lumps which have undergone the washing in the d) third washing step are washed with water and are dried. It is preferable that the obtained crushed polycrystalline silicon lumps of the invention are accommodated in a resin bag to form a crushed polycrystalline silicon lump package. As the material of the resin bag, resin such as polyethylene, polypropylene, polyvinyl chloride, and nylon can be used. A shape of the bag is not particularly limited as long as the crushed polycrystalline silicon lumps can be accommodated and sealed. For example, a gusset bag which is used in the related art for packaging crushed polycrystalline silicon lumps is typically used. The accommodation amount in the resin bag is preferably 25% by volume to 75% by volume with respect to the capacity of the bag. In addition, it is also possible to reduce the inner pressure of bag after accommodation in the above-described amount, and the resin bag is brought into close contact with the crushed polycrystalline silicon lumps.

EXAMPLES

Hereinafter, the invention will be described in more detail with reference to examples, but the invention is not limited by the examples.

Note that, the etching amount and the amount of surface metal contamination in the crushed polycrystalline silicon lumps are measured as follows.

1) Etching amount of Crushed Polycrystalline silicon Lumps

A polycrystalline silicon small-piece group consisting of 50 pieces of cubic polycrystalline silicon in which one side is approximately 7 mm was prepared for etching amount measurement. A total mass of the polycrystalline silicon small-piece group in a dry state was measured in advance, and the polycrystalline silicon small-piece group accommodated in a polytetrafluoroethylene (PTFE) net was applied to washing in the first washing step or the third washing step together with the crushed polycrystalline silicon lumps. Next, a total mass of the polycrystalline silicon small-piece group after the washing treatment was measured, and the thickness (etching amount) of the surface layer removed was calculated on the basis of a mass difference between before and after the washing treatment and a total surface area of the polycrystalline silicon small-piece group.

2) Amount of Surface Metal Contamination of Crushed Polycrystalline silicon Lumps Approximately 40 g of crushed polycrystalline silicon lumps was put into a 500 ml clean polytetrafluoroethylene beaker, 100 ml of dissolving solution (50% by mass-HF: 10 ml, 70% by mass-nitric acid: 90 ml) was added into the beaker, and extraction was performed at 25° C. for 15 minutes. A liquid in the beaker and a washing solution used to cleaning the surface of the crushed polycrystalline silicon lumps with 100 ml of ultrapure water were transferred to a clean polytetrafluoroethylene beaker and the resultant solution was set as a surface extraction solution of the crushed polycrystalline silicon lumps. The surface extraction solution of the crushed polycrystalline silicon lumps was evaporated and dried, 3.5% by mass-nitric acid aqueous solution was added to a constant volume of 20.0 ml, and ICP-MS measurement was performed to measure surface metal mass of each of Na, Mg, Al, K, Ca, Cr, Fe, Ni, Co, Cu, Zn, W, Ti, and Mo. A measurement value of the surface metal mass was divided by the mass of the crushed polycrystalline silicon lumps before extraction, and evaluation was made as a contained amount (pptw) per unit mass of the crushed polycrystalline silicon lumps. Note that, as a measurement device of ICP-MS, "7500 CS" manufactured by Agilent Technologies, Inc. was used. Measurement was performed four times in each of examples and comparative examples, and an average value was calculated.

Example 1

A polycrystalline silicon rod was manufactured by the Siemens method in a reduction reactor, and after introducing air that has passed through a high efficiency particulate air (HEPA) filter into the reactor, the reactor was opened to the air, and the polycrystalline silicon rod was taken out to the outside of the reactor. The polycrystalline silicon rod was crushed with a hammer in which a material of a striking part is composed of a tungsten carbide/cobalt alloy (the amount of tungsten carbide: 82% by mass, and the amount of cobalt: 18% by mass) into crushed lumps in which at least 90% by mass has a size of a major axis in a range of 10 to 120 mm.

Approximately 5 kg of the obtained crushed polycrystalline silicon lumps was applied to the b) first washing step in which the crushed polycrystalline silicon lumps were brought into contact with the fluonitric acid aqueous solution. That is, 5 kg of crushed polycrystalline silicon lumps was put into a resin basket, and the basket was immersed in a washing bath accommodating a fluonitric acid aqueous solution (containing 14.6 parts by mass of hydrogen fluoride and 199 parts by mass of nitric acid with respect to 100 parts by mass of water) obtained by mixing 50 wt % fluoric acid and 70 wt % nitric acid were mixed in a volume ratio of 1:8. Immersion was performed at a liquid temperature of 20° C. and for time for which the etching amount of the crushed polycrystalline silicon lumps was measured as approximately 10 μm). Note that, the polycrystalline silicon small-piece group for etching amount measurement was also accommodated in the washing bath in the first washing step, and measurement on the etching amount was performed. After the first washing step, the crushed polycrystalline silicon lumps were taken out from the washing bath, and were washed with ultrapure water and were subjected to blast drying.

Next, the washed polycrystalline silicon lumps which have undergone the first washing step was applied to the b) second washing step in which the washed product was brought into contact with an alkaline aqueous solution containing hydrogen peroxide. That is, the washed polycrystalline silicon lumps was put into a resin basket, and the basket was immersed in a washing bath accommodating a washing solution (containing 2.1 parts by mass of tetramethyl ammonium hydroxide and 2.1 parts by mass of hydrogen peroxide with respect to 100 parts by mass of water) obtained by mixing a 25 mass % tetramethyl ammonium hydroxide aqueous solution, 30 mass % hydrogen peroxide water, and ultrapure water in a volume of 4:3:43. Immersion was performed at a liquid temperature of 60° C. and for an immersion time of five minutes. After the second washing step, the crushed polycrystalline silicon lumps were taken out from the washing bath, and were washed with ultrapure water and were subjected to blast drying.

In addition, the washed polycrystalline silicon lumps which have undergone the second washing step was applied to the d) third washing step in which the washed product was brought into contact with a fluonitric acid aqueous solution. In the third washing step, the fluonitric acid aqueous solution having the same composition as in the first washing step was used, and various washing operations were performed in a similar manner as in the first washing step. Note that, washing time was set to time for which the etching amount of the crushed polycrystalline silicon lumps is measured as 5 μm. Note that, at this time, in the third washing step, the polycrystalline silicon small-piece group for etching amount measurement was also accommodated in the washing bath, and measurement on the etching amount was performed. After the third washing step, the crushed polycrystalline silicon lumps were taken out from the washing bath, and were washed with ultrapure water and were subjected to blast drying.

With respect to the crushed polycrystalline silicon lumps obtained through the above-described washing method, the amount of surface metal contamination was measured, and was accommodated in a resin bag. A measurement result of surface metal contamination is shown in Table 1.

Example 2

Washing of the crushed polycrystalline silicon lumps was performed by a similar method as in Example 1 except that the washing time in the first washing step in Example 1 was changed to time for which the etching amount of the crushed polycrystalline silicon lumps was measured as approximately 5.0 μm. A result of measurement of surface metal contamination with respect to obtained crushed polycrystalline silicon lumps is also shown in Table 1.

Example 3

Washing of the crushed polycrystalline silicon lumps was performed by a similar method as in Example 1 except that the washing time in the first washing step in Example 1 was changed to time for which the etching amount of the crushed polycrystalline silicon lumps was measured as approximately 1.5 μm. A result of measurement of surface metal contamination with respect to obtained crushed polycrystalline silicon lumps is also shown in Table 1.

Example 4

Washing of the crushed polycrystalline silicon lumps was performed by a similar method as in Example 1 except that the alkaline aqueous solution containing hydrogen peroxide used in the second washing step in Example 1 was changed to a washing solution (containing 3.5 parts by mass of ammonia and 3.2 parts by mass of hydrogen peroxide with respect to 100 parts by mass of water) obtained by mixing a 30 mass % ammonia aqueous solution, 30 mass % hydrogen peroxide water, and ultrapure water in a volume ratio of 12:9:79. A result of measurement of surface metal contamination with respect to obtained crushed polycrystalline silicon lumps is also shown in Table 1.

Comparative Example 1

Washing of the crushed polycrystalline silicon lumps was performed by a similar method as in Example 1 except that the second washing step and the subsequent washing with water in Example 1 are not performed. A result of measurement of surface metal contamination with respect to obtained crushed polycrystalline silicon lumps is also shown in Table 1.

Comparative Example 2

Washing of the crushed polycrystalline silicon lumps was performed by a similar method as in Example 1 except that the washing solution used in the second washing step in Example 1 was changed to a 2 mass % tetramethyl ammonium hydroxide aqueous solution containing no hydrogen peroxide. A result of measurement of surface metal contamination with respect to obtained crushed polycrystalline silicon lumps is shown in Table 1.

TABLE 1

|  |  | Example 1 | Example 2 | Example 3 | Example 4 | Comparative Example 1 | Comparative Example 2 |
|---|---|---|---|---|---|---|---|
| Etching amount in first washing step | | 9.7 μm | 4.8 μm | 1.5 μm | 9.6 μm | 9.5 μm | 10.3 μm |
| Etching amount in third washing step | | 5.1 μm | 4.9 μm | 4.7 μm | 5.0 μm | 5.0 μm | 4.8 μm |
| Surface W concentration [pptw] | | 0.43 | 0.72 | 0.83 | 0.81 | 2.13 | 1.87 |
| Surface Co concentration [pptw] | | 0.06 | 0.04 | 0.07 | 0.05 | 0.12 | 0.18 |
| Other surface metal concentrations | Na [pptw] | 0.77 | 0.96 | 0.96 | 0.73 | 0.89 | 0.65 |
| | Mg [pptw] | 0.19 | 0.31 | 0.39 | 0.77 | 0.72 | 0.12 |
| | Al [pptw] | 0.31 | 0.75 | 0.56 | 1.09 | 0.14 | 0.72 |
| | K [pptw] | 0.43 | 0.38 | 0.59 | 0.65 | 0.57 | 0.39 |
| | Ca [pptw] | 1.39 | 0.99 | 1.56 | 1.83 | 2.20 | 1.44 |
| | Cr [pptw] | 0.26 | 1.56 | 0.21 | 0.15 | 0.52 | 0.26 |
| | Fe [pptw] | 1.63 | 1.29 | 2.03 | 1.61 | 1.90 | 1.23 |
| | Ni [pptw] | 0.15 | 0.21 | 0.11 | 0.21 | 0.31 | 0.17 |
| | Cu [pptw] | 0.07 | 0.05 | 0.09 | 0.27 | 0.09 | 0.06 |
| | Zn [pptw] | 0.78 | 0.89 | 1.01 | 1.51 | 2.11 | 0.99 |
| | Ti [pptw] | 0.62 | 1.02 | 4.02 | 2.78 | 4.62 | 1.59 |
| | Mo [pptw] | 0.04 | 0.03 | 0.03 | 0.06 | 0.04 | 0.03 |
| Total surface metal concentration | | 7.13 | 9.20 | 12.46 | 12.52 | 16.36 | 9.70 |

The invention claimed is:

1. A method for manufacturing a crushed polycrystalline silicon lump, comprising:
    a) a step of crushing a polycrystalline silicon rod;
    b) a first washing step of contacting a crushed polycrystalline silicon lump of the polycrystalline silicon rod with a fluonitric acid aqueous solution;
    c) a second washing step of contacting the crushed polycrystalline silicon lump that has undergone to the first washing step with an alkali aqueous solution containing hydrogen peroxide; and
    d) a third washing step of contacting the crushed polycrystalline silicon lump that has undergone the second washing step with the fluonitric acid aqueous solution,
    wherein the crushed polycrystalline silicon lump has a surface metal concentration of 9.2 pptw or less, and in the surface metal concentration, a surface tungsten concentration is 0.9 pptw or less, and a surface cobalt concentration is 0.3 pptw or less.

2. The method for manufacturing crushed polycrystalline silicon lump according to claim 1, wherein in the c) second washing step, an alkaline substance dissolved in the alkali aqueous solution containing hydrogen peroxide is tetramethyl ammonium hydroxide.

3. The method for manufacturing crushed polycrystalline silicon lump according to claim 1, wherein in the a) step of crushing the polycrystalline silicon rod, a breaking tool in which a material of a striking part is composed of a tungsten carbide/cobalt alloy is used in the crushing.

4. The method for manufacturing a crushed polycrystalline silicon lump according to claim 1, wherein in the b) first washing step, an etching amount of a surface of each crushed polycrystalline silicon lump is 1.5 to 10.0 μm.

* * * * *